(12) United States Patent
Cornic

(10) Patent No.: US 6,230,861 B1
(45) Date of Patent: May 15, 2001

(54) BURIED POWER SUPPLY SYSTEM FOR AN ELECTRIC VEHICLE, AND AN ELECTRIC VEHICLE EQUIPPED TO USE SUCH A SYSTEM

(75) Inventor: Daniel Cornic, Fourqueux (FR)

(73) Assignee: Alstrom Entrepise SA, Levallois Perret (FR)

( * ) Notice: Subject to any disclaimer, the term of this patent is extended or adjusted under 35 U.S.C. 154(b) by 0 days.

(21) Appl. No.: 09/315,067

(22) Filed: May 20, 1999

(30) Foreign Application Priority Data

Jun. 4, 1998 (FR) .................................................. 98 07012

(51) Int. Cl.⁷ ...................................................... B60L 9/00
(52) U.S. Cl. .............................. 191/45 R; 191/6; 191/15; 191/22 R; 191/23 R; 191/25; 191/48
(58) Field of Search ..................................... 191/6, 14, 15, 191/22 R, 23 R, 25, 22 C; 307/125, 130, 9.1

(56) References Cited

U.S. PATENT DOCUMENTS

| | | | |
|---|---|---|---|
| 4,476,947 | * 10/1984 | Rynbrandt | 180/2.1 |
| 5,277,285 | * 1/1994 | Musachio | 191/6 |
| 5,669,470 | * 9/1997 | Ross | 191/10 |

FOREIGN PATENT DOCUMENTS

| | | | |
|---|---|---|---|
| 0761493A1 | * 3/1997 | (EP) | B60M/1/10 |
| 2 762 810 A1 | 11/1998 | (FR) . | |
| 404125004 | * 4/1992 | (JP) | 191/23 R |
| WO 93/10995 | 6/1993 | (WO) . | |

* cited by examiner

Primary Examiner—S. Joseph Morano
Assistant Examiner—Frantz F. Jules
(74) Attorney, Agent, or Firm—Sughrue, Mion Zinn, Macpeak & Seas, PLLC

(57) ABSTRACT

A buried power supply system for an electric vehicle (17) equipped with collector shoes (16, 22), the system comprising a succession of conductive segments (5A, 5B, 5C) that are electrically isolated from one another, and that form a conductive track for the shoes on a road surface. Each segment is provided with individual switching means (11) of the static type, which means are received under the segment in a trough along which a common power supply link (14) and a common return link (13) run. The switching means provide electrical continuity between the segment to which they are assigned and the power return link so long as a connection control signal for connecting a segment to the power supply link is not received from a vehicle either directly by the segment in question (5C) or by either of the immediately adjacent segments (5B, 5D). The vehicles include means for transmitting a connection control signal to a segment of track.

8 Claims, 2 Drawing Sheets

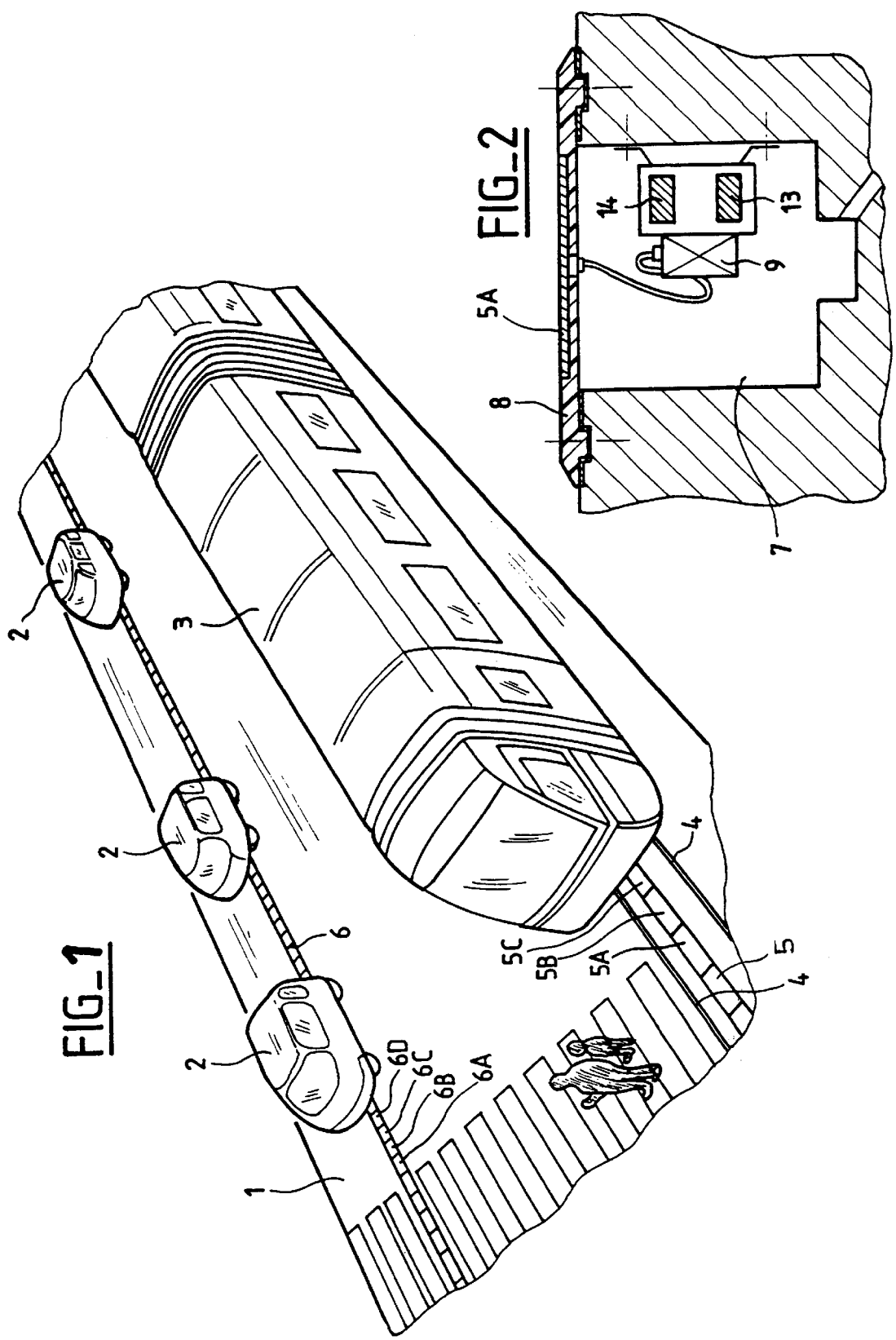

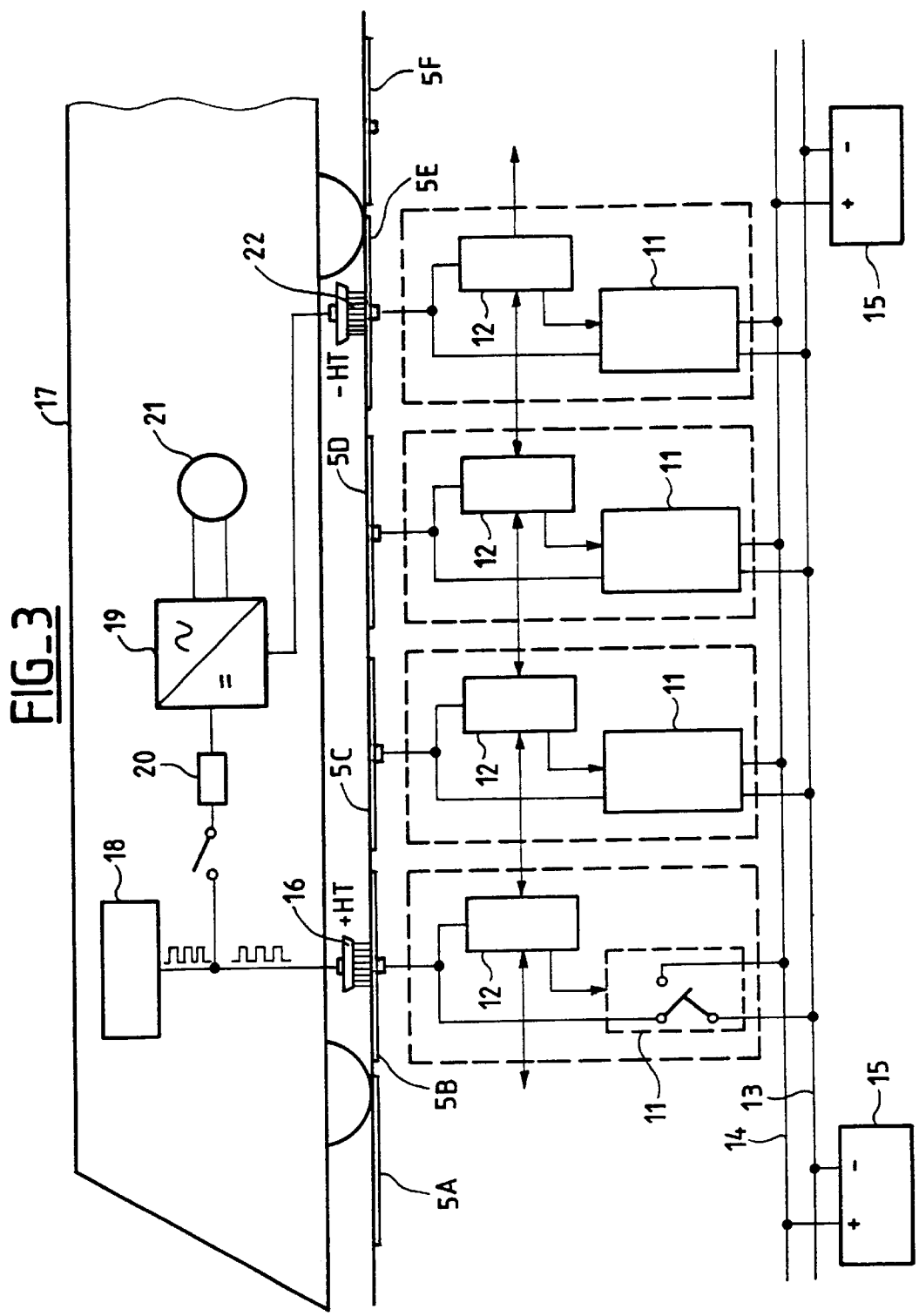
FIG_3

BURIED POWER SUPPLY SYSTEM FOR AN ELECTRIC VEHICLE, AND AN ELECTRIC VEHICLE EQUIPPED TO USE SUCH A SYSTEM

BACKGROUND OF THE INVENTION

The invention relates to a power supply system referred to conventionally as a "buried" power supply system for an urban electric vehicle equipped with collector shoes enabling energy to be collected while the vehicle is moving along a route along which a power supply track extends, the shoes coming into contact with the track. The invention relates more particularly to a system designed to equip traffic lanes or roads having power supply tracks installed at the tops of troughs provided for them in the road surface, and to electric vehicles suitable for using the system.

Moving electric vehicles which collect the energy they need from stationary power supply means with which they remain in electrical contact are generally powered via a network of overhead contact lines extending along routes provided for the vehicles or via power supply rails placed on the ground, when the vehicles run on dedicated tracks.

When overhead lines are used, a network of wires and a set of support means for the network of wires must be present permanently and such that they are unavoidable eyesores above and in the vicinity of roads. This may constitute a drawback considered as prohibitive in protected tourist sectors, and, for example, in listed urban centers.

Conversely, an electric power supply network installed by means of power supply tracks placed on the ground remedies that drawback when the power supply tracks and at least a portion of the means associated with them are disposed in preferably closed troughs that are provided in the road surfaces on which the vehicles run.

Buried power supply systems have long been known. They suffer from the drawback of requiring troughs to be provided to enable the conductive tracks to be laid in road surfaces. It is then necessary to cover the troughs when the road surfaces in which they are provided are not reserved exclusively for electric vehicles, and when it is necessary for a wide variety of vehicles and in particular two-wheelers to be allowed to pass over the troughs. In addition, for obvious safety reasons, it is essential to ensure than nothing apart from a collector shoe of an electric vehicle can be put in electrical contact with a live portion of a conductive track of such a buried power supply system.

Document EP-A-0 761 493 describes a buried power supply system that satisfies those criteria. It makes provision for a conductive track to be laid that is made up of a succession of plates that are electrically isolated from one other and that cover a trough at the bottom of which an elastically deformable strip extends containing a ferromagnetic material and whose two faces are covered with a conductive material. The top face of the strip is connected to a power supply line. The strip can be magnetically attracted by magnets carried by an electric vehicle so as to come into contact via its top face with at least one plate of the conductive track against which a collector shoe of the vehicle moves. The other plates of the conductive track, against which plates the strip rests, are connected to a very low potential via the bottom face of the strip, which face serves a power return.

SUMMARY OF THE INVENTION

The invention proposes a buried power supply system of modular construction for an electric vehicle (guided or otherwise), which system is very simple to operate, has a very short response time, and makes it possible to obtain improved safety and improved reliability.

The buried power supply system is organized to be associated with electric vehicles, each of which is equipped with energy collector shoes aligned along a preferably middle longitudinal axis of the vehicle, and the system comprises a succession of conductive segments that are electrically isolated from one another, that form a conductive track for the shoes, and that are disposed such as to cover a trough provided in a road surface on which vehicles run and with which the segments are flush. Individual switching means of the static type for each segment provide electrical continuity between the segment to which they are assigned and a power return link so long as a connection control signal for connecting a segment to a power supply link is not received for them from a vehicle.

According to a characteristic of the invention, the individual connection means specific to a segment are disposed under it in the trough along which the power supply link and the power return link that are common to the segments run, and the switching means specific to each segment are controlled by individual signal pick-up means for taking into account an encoded connection control signal, which pick-up means are selectively interconnected with the pick-up means of the immediately adjacent segments in the succession of segments forming a conductive track, or else with the single immediately adjacent segment when the segment is situated at one end of the track, so that an encoded connection control signal that is selectively received from a vehicle by a segment causes the power supply link to be connected to said segment and to the segment(s) that is/are immediately adjacent thereto.

The invention also provides vehicles equipped to used the above power supply system.

According to another characteristic of the invention, such a vehicle includes means for transmitting a segment connection control signal, which means produce an encoded control signal of the digital type which is transmitted to a track segment with to the vehicle is electrically connected via a power supply shoe.

BRIEF DESCRIPTION OF THE DRAWINGS

The invention, its characteristics, and its advantages are made clearer in the following description given with reference to the below-listed figures, in which:

FIG. 1 shows two examples of how buried power supply systems of the invention may be installed;

FIG. 2 is a cross-section view of a road surface provided with a trough equipped with a buried power supply system of the invention; and FIG. 3 is a diagram summarizing a power supply system of the invention, and an electric vehicle designed for such a system.

DETAILED DESCRIPTION OF THE INVENTION

The drawing in FIG. 1 shows the road surface 1 on which vehicles travel and on which pedestrians walk, it being possible for the vehicles to be of a wide variety of types, represented in this example by private vehicles 2, at least some of which are assumed in this example to be electric vehicles or combined-energy vehicles, and by electric or combined-energy public transport vehicles 3, assumed in this example to be a tram running on rails 4.

Provision is made for electric vehicles or combined-energy vehicles, which are assumed to be equipped with an electric motor associated with an internal combustion engine, to be electrically powered from buried via shoes designed to remain in contact with a conductive track present in a lane or path, and in particular a lane of a road on which said vehicles and optionally other vehicles can travel.

Two conductive tracks 5 and 6 serving to power different vehicles are shown in FIG. 1. The conductive track 5 serves more particularly to power public transport vehicles, e.g. trams having metal wheels running on rails as shown, trams equipped with tired wheels running directly on the road surface, or trolleybuses equipped with collector shoes under their bodies, like the other vehicles considered in this example.

The conductive track 5 is assumed in this example to serve to provide a high-voltage power supply to the vehicles, and optionally a power return. The return may also be provided through the rails when the vehicles run on electrically-conductive rails. The power supply voltage may, for example, be a DC voltage, or a single-phase AC voltage corresponding to one of the phases of a three-phase power supply.

The conductive track 6 serves more particularly to power electric or combined-energy private vehicles provided with collector shoes, each vehicle being provided with at least one power supply shoe and one return shoe. The conductive track 6 may optionally be used by a vehicle having one or more power supply shoes only, the return current then flowing via other means. The combined-energy vehicles are assumed in this example to be equipped with means enabling them to move in the traffic either by being powered from a conductive track that they follow as they move, or else independently by using some other energy source, e.g. by using on-board batteries of storage cells.

The conductive tracks 5 and 6 may be made in similar manner. They are different insofar as the characteristics, in particular the size and power characteristics, of the vehicles for which they are designed are different.

In all cases, each conductive track designed to co-operate with vehicle collector shoes is made up of a succession of conductive segments 5A, 5B, 5C, . . . or 6A, 6B, 6C, 6D, . . . that are substantially touching although they are electrically isolated from one another by a suitable insulating material of determined minimum thickness that is a function, in particular, of the power supply voltage delivered to the vehicles.

Each segment has a length which is dependent on the length of the vehicles to be powered. The width of the segments is chosen to be large enough to ensure that it remains in contact over the entire width of a shoe while taking into account any sideways movements of the shoe as it runs over the length of a segment. In an embodiment, the length of a segment is approximately in the range one meter to two meters, while its width is of the order of thirty centimeters.

The successive segments distributed along the length of a track are disposed so as to cover a trough 7 provided over at least a portion of the length of a road surface which may be used by pedestrians, and by vehicles of potentially very different types ranging from lightweight vehicles of the two-wheeler type to heavy goods vehicles. In a preferred embodiment, a trough of a power supply system of the invention, and the succession of segments forming the conductive track which covers it are disposed in the center of a traffic lane on the road surface in which the trough is provided, so that the shoes of the vehicles can be aligned along a longitudinal axis, preferably extending along the middles of the vehicles equipped with the shoes. This makes it easier for the shoes of a vehicle and the segments of track that are live while a vehicle powered by a track passes over them to be put out of reach .

In the embodiment shown in FIG. 2, the segment 5A, shown in cross-section, is assumed to be positioned in a frame 8 made of an insulating material that is capable of withstanding heavy loads, as is the segment, when a vehicle passes over it. Each segment is made of an electrically conductive material of high rigidity, and it is mounted in the frame 8 in which it is positioned such as to close a section of trough 7 over which the frame is held stationary. The trough is then closed in watertight manner by the assembly formed by the alignment of frames 8 provided for the segments and by the segments positioned in said frames. In this example, the frames and the segments are organized to come flush with the level of the road surface 1. They may optionally project slightly as shown in FIG. 2, if the track is provided in a dedicated traffic lane which is reserved for a determined type of vehicle, e.g. a tram on rails.

Each conductive track segment is preferably associated with a modular structure which is specific to it and in which it is associated with the frame that carries it and with means described below which are also specific to it, this configuration making it easier to replace worn or defective elements.

In a preferred embodiment, each module specific to a conductive track segment includes an individual housing 9 receiving the means making it possible to control the power supply of the segment, and also to act on the corresponding means of the segments immediately adjacent to said segment. The individual housing 9 is received under a segment in the section of trough that is covered by said segment.

The power supply control means of a segment essentially include individual switching means 11, of the static type, and individual signal pick-up means 12 for taking into account the connection control signal transmitted from a vehicle (see FIG. 3).

The individual switching means 11 of a segment are represented in this example by a change-over switch type rest contact, and they are constituted by a conventional electronic power circuit which puts the segment in connection with a power return link 13 brought to a potential that is ideally zero and that is in practice low enough to be safe, so long as a connection control signal for causing the segment to be connected to a power supply link 14 is not received from a vehicle.

The individual switching means of each segment of a conductive track are connected firstly to a power supply link 14, and secondly to a power return link 13, these links being common to the segments of the track in question, as shown in FIG. 3. In this example, the links are assumed to run along the trough 7 in which the housings containing the switching means 11 are received, as shown in FIG. 2. For example, the links may be constituted by copper or aluminum bars embedded in a watertight insulating resin, and they are connected conventionally to power supply means 15 serving as a source. These power supply means are optionally relayed, e.g. assumed to be duplicated at the ends of the links as shown in FIG. 3, and they are conventionally implemented in the form of substations which are equipped with the protective devices commonly used in this field. The power supply link 14 serves to deliver the power supply current that is assumed to be DC in this example, and that is necessary for the motors of the vehicles suitable for being powered by means of the system of the invention via their respective shoes, and via track segments onto which the shoes come as the vehicle moves. The primary voltage between links 13 and 14 is, for example, a DC voltage of the order of 350 volts or 750 volts, for public transport vehicles, but it may also be a single-phase AC voltage, e.g. 400 volts.

In the invention, all of the segments of a track, such as, for example, the track 5, are normally in connection with the power return link 13 via individual switching means 11 which serve them respectively. The only ones of their segments that are live are those which have their switching means temporarily controlled by a control signal from a vehicle so as to connect them temporarily to the power supply link 14.

To achieve this, individual signal pick-up means 12 for taking the control signals into account are associated with each segment so as to pick up the connection control signals coming from the vehicles. These means are assumed in this example to be received with the switching means 11 specific to each segment in the housings 9 individually associated with the segments.

The signal pick-up means 12 pick up the connection control signal transmitted by a vehicle to the segment to which they are assigned. They then produce a connection command addressed to the switching means specific to said segment. In a preferred embodiment, a connection command is applied to the switching means specific to a segment only so long as a connection control signal delivered by a vehicle is received for the segment in question.

In the proposed embodiment, a segment of a track is connected when the connection control signal delivered by a vehicle is received either directly by the segment in question, or via one or other of the two immediately adjacent segments, or else, by the only immediately adjacent segment for a segment situated at the end of a track.

The connection control signal delivered by the vehicle, such as, for example, the vehicle 17, is assumed to be produced by a transmitter circuit 18. For example, this transmitter circuit is connected to the power supply shoe 16 via a transmission interface (not shown) so as to transmit a connection control signal by electrical conduction in the form of an encoded digital signal. An encoded digital signal in the form of a carrier-current frequency signal may also be considered. The encoded signals are used to convey specific information for safety purposes, and, for example, a cyclically-recognized safety message and/or one or more indications relating to the vehicle, such as, for example, an indication of type. The power supply shoe 16 is the shoe via which the vehicle is connected to the positive power supply potential via the power supply link 14 when the power supply is a DC power supply.

In the embodiment proposed, the control signal is continuous when the vehicle is to be powered. It is assumed to be transmitted by the transmitter circuit of a vehicle to the signal pick-up means 12 associated with a segment, via the power supply shoe 16 of the vehicle, which shoe is then in contact with the segment, e.g. to the signal pick-up means 12 provided for the segment 5B in contact with the power supply shoe 16 in FIG. 3.

In a variant, the encoded digital signal corresponding to a connection command produced by a transmitter circuit 18 of a vehicle whose power supply shoe 16 is in contact with a segment is a microwave frequency signal sent by an antenna towards the segment. The signal pick-up means 12 assigned to the various segments are then equipped with suitable signal receivers.

In a preferred embodiment of the invention, the signal pick-up means specific to a segment are interconnected with the pick-up means of the immediately adjacent segments, or of the immediately adjacent segment for a segment situated at one end of the track. These interconnections serve to ensure that the segment(s) immediately adjacent to a determined segment is/are connected to the power supply link 14 by its/their respective switching means, when the signal pick-up means of the determined segment receive a connection control signal via the segment to which they are assigned.

The signal pick-up means specific to each segment comprise, for example, an associative electronic logic circuit (not shown) making it possible to control the connection of the segment to the power supply link 14 by acting on the switch means 11 specific to the segment. To enable the above-mentioned process to be implemented, a connection command addressed to the switching means specific to a segment may be produced either by the signal pick-up means relating to the segment, or by the signal pick-up means of the segments that flank said segment. A segment continues to be connected to the power supply link so long as a connection control signal is received either by the segment or by either one of the immediately adjacent segments.

In the example shown, the power supply current (assumed to be DC and delivered from buried to a vehicle) is applied to a DC-to-AC converter 19 via a stop/go control member 20, the converter making it possible to use an AC motor 21 as is known in this field.

The power supply current transmitted via a power supply shoe may optionally be returned via a rail on which the vehicle 17 runs, when said vehicle is provided with electrically-conductive wheels. The current may also be returned via a guide rail for guiding the vehicle, if said guide rail is electrically connected to the return link 13 serving the conductive track with which the rail is associated.

In another embodiment, that can be used with any vehicle equipped with at least two collector shoes, one of which is a power supply shoe and the other is a return shoe, the shoes thus having different polarities, provision is made for the shoes to be aligned on a longitudinal axis of the vehicle that carries them. The axis preferably being chosen to extend along the middle of the vehicle for reasons of safety. Provision is then made for the pitch between different-polarity shoes to be a function of the length of the segments, and more particular a pitch longer than the sum of the lengths of three segments in the system described above.

As indicated above, the power supply shoe 16 then causes the power supply link 14 to be connected to the segment with which it is in contact, if said segment is not yet connected to said link under the action of the signal pick-up means of an immediately adjacent segment. The power return can then be provided by a return shoe which remains connected to the power return 13, such as the shoe 22 in this example in contact with a segment 5E, insofar as neither this segment nor the segments immediately adjacent to it have received a connection control signal from the vehicle 17.

It should be understood that a plurality of power supply shoes 16 may be distributed over the length of a vehicle if necessary. The same applies to the return shoes 22, if such shoes are provided to return the current via segments of the same track. The connection command may be produced simultaneously by all of the shoes, or individually by each of them using techniques that are not described herein insofar as they are not the subject of the present invention. Provision is also made to bring the shoes of a vehicle into service by lowering them onto the segments, and to take them out of service by raising them.

In addition, the system of the invention may be associated with another system, e.g. a system for powering vehicles via overhead contact lines. Such a system is then provided for delivering power to vehicles over a different portion of a determined route, the vehicles naturally being organized to operate with either system.

What is claimed is:

1. A buried power supply system for an electric vehicle comprising at least one energy collector shoe disposed along a longitudinal axis of the vehicle, the system comprising:

a trough provided in a road surface on which the electric vehicle travels;

a plurality of successive conductive segments forming a conductive track for the energy collector shoe of the vehicle, wherein the segments are electrically isolated from one another and are disposed to cover the trough so that the segments are flush with the trough;

a power supply link disposed in the trough;

a power return link disposed in the trough;

a plurality of switching units corresponding to the segments, each of the switching units selectively connecting a corresponding one of the segments to the power return link or the power supply link in accordance with a connection command signal, wherein said switching units are disposed under the corresponding segments in the trough; and a plurality of signal pick-up units corresponding to the segments and the switching units, each of the signal pick-up units receiving a connection control signal transmitted by the vehicle whose energy collector shoe is in contact with a corresponding one of the segments and generating the connection command signal for controlling a corresponding one of the switching units in accordance with the connection control signal, wherein each of the signal pick-up units is interconnected to adjacent ones of signal the pick-up units so that when the connection control signal from the vehicle is received by one of the signal pick-up units, the power supply link is connected to the corresponding segment and to those segments which are immediately adjacent to the corresponding segment.

2. A buried power supply system according to claim 1, wherein the signal pick-up units receive the connection control signal transmitted by electrical conduction from the vehicle via the energy collector shoe of the vehicle when the shoe is in contact with the corresponding segment.

3. A buried power supply system according to claim 1, wherein said encoded connection control signal is transmitted in microwave form by the vehicle whose power supply shoe is in contact with the corresponding segment.

4. A buried power supply system according to claim 1, wherein a length of each of the segments is less than a length of the electric vehicle.

5. A transportation system comprising an electric vehicle and a buried power supply system for the electric vehicle, the electric vehicle comprising:

at least one energy collector shoe disposed along a longitudinal axis of the vehicle; and transmitter means for transmitting an encoded connection control signal via the energy collector shoe, the power supply system comprising:

a trough provided in a road surface on which the electric vehicle travels;

a plurality of successive conductive segments forming a conductive track for the shoe of the vehicle, wherein the segments are electrically isolated from one another and are disposed to cover the trough so that the segments are flush with the trough;

a power supply link disposed in the trough;

a power return link disposed in the trough;

a plurality of switching units corresponding to the segments, each of the switching units selectively connecting a corresponding one of the segments to the power return link or the power supply link in accordance with a connection command signal, wherein said switching units are disposed under the corresponding segments in the trough; and a plurality of signal pick-up units corresponding to the segments and the switching units, each of the signal pick-up units receiving the connection control signal transmitted by the vehicle when the power supply shoe is in contact with a corresponding one of the segments and generating the connection command signal for controlling a corresponding one of the switching units in accordance with the connection control signal, wherein each of the signal pick-up units is interconnected to adjacent ones of the signal pick-up units so that when the connection control signal from the vehicle is received by one of the signal pick-up units, the power supply link is connected to the corresponding segment and to those segments which are immediately adjacent to the corresponding segment.

6. A transportation system according to claim 5, wherein the transmitter means transmits the encoded connection control signal via the energy collector shoe of the vehicle.

7. A transportation system according to claim 5, wherein the transmitter means transmits a microwave encoded connection control signal via an antenna carried by the vehicle to the corresponding segment with which the energy collector shoe is in contact.

8. A buried power supply system according to claim 5, wherein a length of each of the segments is less than a length of the electric vehicle.

* * * * *